United States Patent Office 3,534,990
Patented Oct. 20, 1970

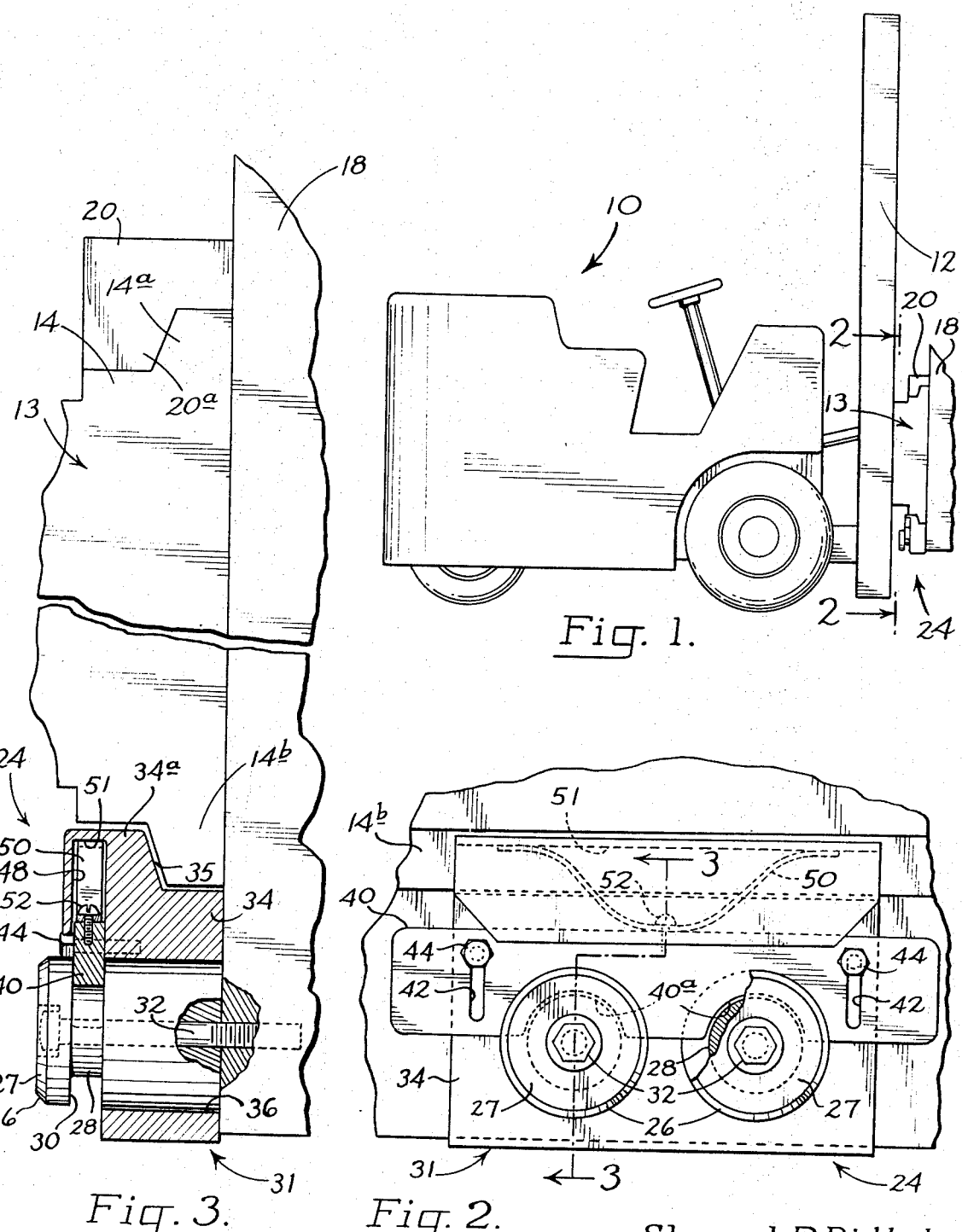

3,534,990
QUICK DISCONNECT COUPLING
Stewart R. Didtel and Jack W. Brown, Gresham, Oreg., assignors to Cascade Corporation, Portland, Oreg., a corporation of Oregon
Filed Feb. 27, 1969, Ser. No. 802,881
Int. Cl. F16b 9/00
U.S. Cl. 287—20.5                                    9 Claims

ABSTRACT OF THE DISCLOSURE

A disconnectable coupling mechanism releasably securing an attachment to a lift truck or other elevatable carriage plate. The coupling mechanism includes a stud secured to the attachment and projecting toward the carriage plate terminating in a cap forming a shoulder. A hook plate removably mounted on the stud includes a flange that overlaps a portion of the carriage plate. A locking bar mounted on the hook plate has a locking position where it engages the shoulder formed by the cap and inhibits movement of the hook plate off the stud. A spring yieldably urges the locking bar into its locking position. The locking bar may be moved against the biasing of the spring to an unlocked position, where it is free of the shoulder, to permit the hook plate to be moved off the stud.

---

This invention relates to a disconnectable coupling mechanism for releasably securing two elements together. In a more particular sense, the coupling mechanism is for releasably securing an attachment, such as a lift truck attachment to an elevatable carriage plate, such as the carriage plate conventionally found on the mast of a lift truck.

A general object of the invention is to provide a novel disconnectable coupling for detachably connecting two elements together, which is simple and reliable, and may be manipulated without tools and by hand.

As specifically contemplated, the coupling includes an anchor secured to one of the pair of elements to be connected, and a hook plate detachably secured to the anchor having a portion overlapping a margin of the other element to be connected to inhibit relative movement between the two elements. The hook plate may be detached from the anchor without the use of tools, to permit the two elements to be disconnected.

Yet another object is to provide such a coupling which includes a unit which is detachably secured in place to secure an attachment to an elevatable carriage plate, and which is disconnectable by hand to release the attachment, the unit then being either replaceable on the attachment or usable to connect some other attachment to the carriage plate.

A further object is to provide a coupling for detachably securing an attachment to a lift truck or other elevatable carriage plate, comprising an upper fixed hook plate that fits over an upper margin of the carriage plate and absorbs the major portion of the load applied to the attachment, and a lower hook plate which is part of a unit detachably secured in place to completely anchor the attachment.

These and other objects will become more fully apparent as the following description is read in conjunction with the drawings, wherein:

FIG. 1 is a side elevation of a lift truck having a carriage adjacent one end, with coupling mechanism constructed in accordance with an embodiment of the invention securing an attachment to a plate in the carriage;

FIG. 2 is a view taken generally along the line 2—2 in FIG. 1, and somewhat enlarged, illustrating details of the coupling mechanism; and FIG. 3 is a cross-sectional view, taken generally along the line 3—3 in FIG. 2.

Referring now to the drawings, and first more specifically to FIG. 1, at 10 is indicated generally a lift truck. A substantially upright mast 12 is mounted on the front end of the truck, and a carriage 13 is mounted on and movable vertically along the mast. As is best seen in FIG. 3, the carriage includes the usual carriage plate 14, bounded by flanges 14a, 14b of reduced thickness extending along the top and bottom of the carriage plate.

The rear portion only of an attachment for the lift truck is indicated at 18. The attachment is detachably mounted on the top of the carriage plate by an upper, fixed, elongated hook plate 20, which is permanently secured to the attachment. Hook plate 20 includes a flange 20a that overlaps the upper flange of the carriage plate. Only the end of the hook plate is shown in FIG. 3, but it should be understood that the same is an elongated member which extends along the length of flange 14a. To inhibit lateral movement of the attachment on the carriage, and for the purpose of centering the attachment on the carriage, hook plate 20 may include a notch (not shown) between its ends which fits over cooperating means on the carriage plate with the attachment properly positioned.

The attachment is secured to the bottom of the carriage plate, adjacent each side of the plate, by coupling mechanism, such as the one shown at 24 in FIGS. 2 and 3.

Referring now specifically to FIGS. 2 and 3, coupling mechanism 24 includes a pair of elongated studs 26, also referred to herein as hook plate anchors, which are secured to the attachment by bolts 32. The studs project outwardly from the attachment toward the carriage plate. As is best seen in FIG. 3, each stud has an annular groove 28 adjacent its outer end next to a cap 27 which defines a shoulder or catch 30 adjacent the outer extremity of the stud that faces the attachment.

A detachable unit 31 is detachably latched to the studs 26 to produce a coupled connection of the attachment to the carriage plate.

Further describing unit 31, such includes a block-shaped lower hook plate 34. A pair of stud-receiving bores such as the one indicated at 36 in FIG. 3, extend through the plate. Flange 34a having an inner bearing surface 35 extends along the top of the hook plate and overlaps flange 14b of the carriage plate. With unit 31 latched in place, this flange of the hook plate prevents separation of the attachment from the lower margin of the carriage plate.

An elongated substantially horizontal locking bar 40 is mounted outwardly of bores 36, for movement vertically on the lower hook plate. As is best seen in FIG. 3, locking bar 40 has a thickness slightly less than the width of groove 28, and as seen in FIG. 2, a pair of spaced arcuate indentations 40a are defined on the lower edge of the bar. By reason of this construction, the bar can seat within grooves 28 inwardly of shoulders 30, for the purpose of latching the hook plate onto the studs 26.

The locking bar is slidably mounted on the hook plate 34 by a pair of spaced-apart cap screws 44 which extend through slots 42 in the locking bar. The slots permit upward movement of bar 40, which movement is laterally of the studs, from the locking position shown in FIGS. 2 and 3, to an unlocked position where the bar is free of shoulders 30.

A channel 48 is provided in hook plate 34 above the locking bar. Leaf spring 50 within this channel has ends engaging inner channel surface 51 and its center is secured by screw 52 to the top of the locking bar. Spring 50 acts as a biasing means urging the locking bar downwardly toward the locking position for the bar illustrated in FIGS. 2 and 3.

It should be obvious that with a pair of coupling mechanisms of the type just described securing the base of the attachment to the lower margin of the carriage plate adjacent each of its sides, and with the fixed hook plate 20 securing the attachment to the top margin of the carriage plate, a rigid connection is formed fully capable of withstanding the various types of loads applied to an attachment during its operation. The weight of the attachment and any mass which it supports, and forces tending to pull the top of the attachment outwardly from the carriage plate are withstood by the upper hook plate which is permanently secured to the attachment. Forces tending to push the attachment against the carriage are withstood by the bearing surface provided along the front of the carriage plate. The only forces which the lower hook plates must withstand are those which tend to pull the lower part of the attachment forwardly of the base of the carriage plate, and with the usual material-handling equipment which constitutes an attachment forces of this nature are minor.

In the event it is desired to remove an attachment secured by the construction described, it is a simple matter for an operator to remove a unit 31 merely by pulling up its locking bar to free it from the studs and then drawing the unit over the studs and away from the attachment. With the attachment thus free of the lower margin of the carriage plate it is a simple matter to completely free the attachment, usually by resting the attachment on a support and then by dropping the carriage plate whereby its top margin moves downwardly and free of the upper hook plate 20.

The unit 31 is self-contained and includes no disconnectable parts which might be lost over a period of time. If it is the practice of a lift truck user to have several different types of attachments with the specific one in use being changed from time to time, the various attachments may be made freely interchangeable by providing each with an upper hook plate and suitable studs 26 adapted for the mounting of units 31. The same units 31 may then be used for the mounting of any specific attachment which is in use at any given time.

No tools are required in disconnecting a unit 31 from its mounting which, of course, is a decided advantage.

While a particular embodiment of the invention has been described it should be obvious that variations and modifications are possible which would be apparent to one skilled in the art.

It is claimed and desired to secure by Letters Patent:

1. Mounting means for detachably mounting an attachment on an elevatable carriage plate comprising
    an upper hook plate secured to the attachment overlapping an upper margin of the carriage plate and holding the two with one against the other, and
    a disconnectable coupling including a lower hook plate overlapping a lower margin of the carriage plate, said disconnectable coupling further including:
    a lower hook plate anchor joined to the attachment and projecting outwardly from the attachment under the carriage plate, said anchor including a catch spaced from the attachment,
    a locking bar having a locking position where it engages said catch and is interposed between the anchor and lower hook plate, the locking bar in its said locking position securing the lower hook plate in place, said locking bar having an unlocked position where it is free of the catch and the hook plate is removable, and
    biasing means urging the locking bar to its locking position.

2. The mounting means of claim 1, which further comprises guide means for guiding the locking bar as it is moved between its locking and unlocked positions.

3. The mounting means of claim 1, wherein said biasing means comprises a spring interposed between said locking bar and said lower hook plate.

4. The mounting means of claim 1, wherein said hook plate anchor comprises an elongated stud, said catch comprises a shoulder on said stud facing the attachment, and said locking bar has an indentation defined therein which fits about a portion of the stud disposed toward the attachment from the shoulder, with the locking bar in its locking position.

5. The mounting means of claim 1, wherein said hook plate has a bore extending therethrough, said anchor extends through said bore, the catch is spaced outwardly from said bore, and said locking bar is slidably mounted on said hook plate for engagement with said catch in a region disposed outwardly from said bore.

6. A disconnectable coupling mechanism for releasably securing two abutting elements together comprising
    an elongated stud secured to and projecting outwardly from one element, said stud having a shoulder spaced outwardly from and facing the one element, a flange portion on the other element,
    a hook plate having a flange with a bearing surface on one of its sides removably received on said stud with its said bearing surface overlapping the flange portion of the other element in such manner as to prevent separation of said other element from said one element,
    a locking bar having a locked position and in this position engaging said shoulder of said stud and being interposed between the stud and hook plate to inhibit movement of the hook plate axially on the stud, said locking bar being movable laterally of the stud to an unlocked position disposed free of said shoulder to permit movement of the hook plate axially of the stud, and
    biasing means yieldably urging the locking bar toward its locked position.

7. The mechanism of claim 6, wherein said hook plate further comprises guide means for guiding the locking bar as it is moved between its locking and unlocked positions.

8. The mechanism of claim 6, wherein said locking bar has an indentation defined therein which fits about a portion of the stud which is disposed toward the one element from said shoulder, with the locking bar in its locked position.

9. The mechanism of claim 6, wherein said hook plate has a bore extending therethrough, said stud extends through said bore, and said locking bar is slidably mounted on said hook plate for engagement with said shoulder in a region disposed outwardly from said bore.

References Cited

UNITED STATES PATENTS 2,647,294  8/1953  Davis _____ 287—20.927 XR
2,807,493  9/1957  Ryan et al. _____ 214—651 XR DAVID J. WILLIAMOWSKY, Primary Examiner A. V. KUNDRAT, Assistant Examiner U.S. Cl. X.R.
287—130